United States Patent [19]

Milek

[11] Patent Number: 4,720,007
[45] Date of Patent: Jan. 19, 1988

[54] SUSPENDED IDLER ROLLER FOR SUPPORTING A TROUGHING BELT

[76] Inventor: Robert C. Milek, 6560 Stones Throw Dr., Omaha, Nebr. 68152

[21] Appl. No.: 940,660

[22] Filed: Dec. 11, 1986

Related U.S. Application Data

[63] Continuation-in-part of Ser. No. 756,078, Jul. 17, 1985.

[51] Int. Cl.$^4$ ............................................. B65G 15/08
[52] U.S. Cl. ................................. 198/827; 198/830; 277/212 FB
[58] Field of Search ....................... 198/827, 828, 830; 277/101, 212 FB

[56] References Cited

U.S. PATENT DOCUMENTS

| | | |
|---|---|---|
| 2,297,813 | 10/1942 | Stork . |
| 2,820,541 | 1/1958 | Barnish et al. . |
| 2,862,608 | 12/1958 | Newton . |
| 2,876,890 | 3/1959 | Baechli . |
| 3,092,240 | 6/1963 | Tyler et al. . |
| 3,124,238 | 3/1964 | Tyler . |
| 3,166,184 | 1/1965 | Boyd . |
| 3,182,788 | 5/1965 | Donadio et al. . |
| 3,682,294 | 8/1972 | Milek . |
| 3,810,358 | 5/1974 | Bruce . |
| 4,134,255 | 1/1979 | McBain et al. . |
| 4,134,488 | 1/1979 | Bigney . |

FOREIGN PATENT DOCUMENTS

| | | | |
|---|---|---|---|
| 221417 | 5/1962 | Austria | ................................. 198/827 |
| 1511414 | 4/1968 | France . | |
| 1030174 | 5/1966 | United Kingdom . | |

*Primary Examiner*—Joseph E. Valenza
*Attorney, Agent, or Firm*—Zarley, McKee, Thomte, Voorhees & Sease

[57] ABSTRACT

A suspended idler roller for supporting a troughing belt for use in the conveying of granular bulk material such as sand, gravel, crushed stone, grain, coal, fertilizer, etc. The idler roller comprises a plurality of intermediate idler wheels positioned on an elongated curved support rod between a pair of end idler rollers. Each of the idler rollers has elongated hubs having teeth on the ends thereof which mesh with the teeth on the next adjacent roller so that all of the idler rollers rotate in unison on the support rod. A flexible bellows element is positioned between each pair of idler wheels and has its ends operatively sealed and secured to the idler wheels for preventing contaminants from coming into contact with the bearing surfaces.

5 Claims, 5 Drawing Figures

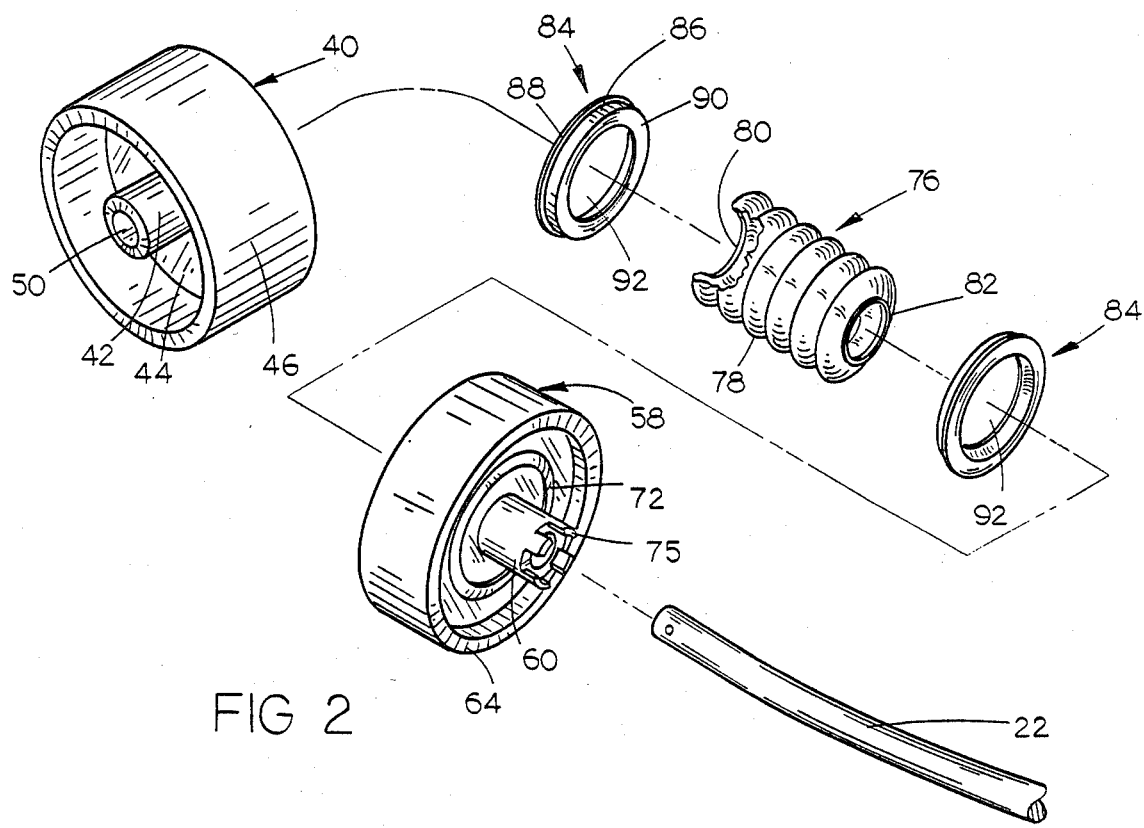
FIG 2
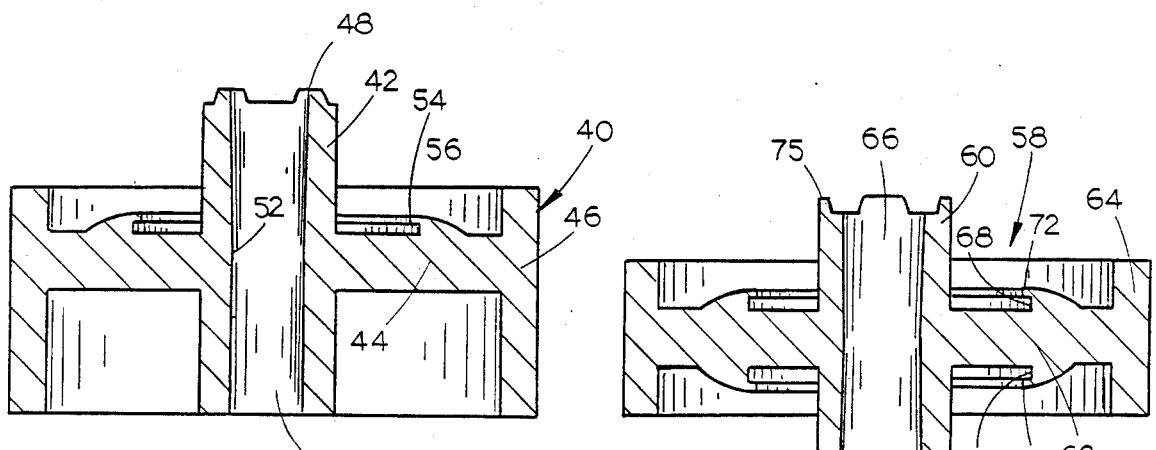
FIG. 3
FIG. 4

SUSPENDED IDLER ROLLER FOR SUPPORTING A TROUGHING BELT

CROSS-REFERENCE TO RELATED APPLICATION

This is a continuation-in-part application of Ser. No. 756,078 filed July 17, 1985.

TECHNICAL FIELD

The present invention relates generally to a suspended idler roller for supporting a troughing belt for use in the conveying of granular bulk material such as sand, gravel, crushed stone, grain, coal, fertilizer, etc. More particularly, the invention relates to idler rollers having moving parts which are positively sealed from environmental contaminants and which are energy efficient.

BACKGROUND OF THE INVENTION

For many years the most popular means for supporting troughed conveyor belts has been through the use of a plurality of spaced-apart idler roller assemblies each comprising three or five rollers. Each of the rollers of each assembly is independently journaled at each end by bearings and is supported by an axle assembled on a common framework. The individual rollers are normally sloped upwardly and outwardly from the horizontally disposed centermost roller at an angle which may vary from 20° to 45° from the horizontal to provide the desired depth of trough. A difficulty generally experienced with three and five roller idlers is that the bearings and seals are located in each end of each roller and are exposed to moisture and contaminants which enter through the rotating bearing seals. In addition, the material utilized in the manufacture of three and five roller idlers is a ferrous material which is subject to rapid deterioration in corrosive environments.

Numerous attempts have been made to duplicate the troughing capabilities of multiple idler rollers by the use of a single catenary roller assembly. The structural means normally employed to support the idler roller assembly and the product conveyed is a wire rope cable or multiple cables to which rubber-like disks or wheels are bonded. The cable core permits deflection at the center of the assembly with the assembly being equipped with bearings at each end of the cable thereby permitting a rotation of the assembly about the curved catenary cable axis. The catenary configuration results from the natural sag of the assembly at its center due to its dead weight.

The primary problem with the utilization of such catenary idler rollers is the premature and often unanticipated failure of the cable core member. This failure results from the rapid rotation of the core member under tensile load while in a curved configuration thereby causing fatigue failure of the cable wire elements due to rapid reversal of stresses.

It is therefore a principal object of this invention to provide an idler roller which overcomes the tendency towards fatigue failure common to catenary idlers by employing a series of molded plastic idler wheels which turn in unison on a rigid curved axis rod.

A further object of the invention is to provide an idler roller assembly for a belt conveyor wherein the individual idler wheels are operatively interconnected so that they rotate in unison.

Yet another object of the invention is to provide an idler roller assembly for a belt conveyor comprising a plurality of idler wheels rotatably mounted on a curved rod with the idler wheels having a centrally disposed hub portion having a bore extending therethrough with the bore being tapered radially outwardly towards both ends from the center thereof.

Still another object of the invention is to provide an idler roller assembly for a belt conveyor which employs a plurality of individual idler wheels with the inner bearing surface of the idler wheels being formed from a bearing-like material providing lubricity to the rolling elements.

Yet another object of the invention is to provide an idler roller assembly for a belt conveyor including means for sealing the inner bearing surfaces from exterior contaminants.

Yet another object of the invention is to provide an idler roller which utilizes a molded plastic material which is wear resistant and which is impervious to deterioration from moisture or corrosive environments.

Still another object of the invention is to provide an idler roller assembly for a belt conveyor which is economical of manufacture, durable in use and refined in appearance.

BRIEF DESCRIPTION OF THE DRAWINGS

FIG. 2 is a partial exploded perspective view:

FIG. 3 is a sectional view of one of the end idler wheels of the invention:

FIG. 4 is a sectional view of one of the intermediate idler wheels of the invention.

SUMMARY OF THE INVENTION

Figure 1:
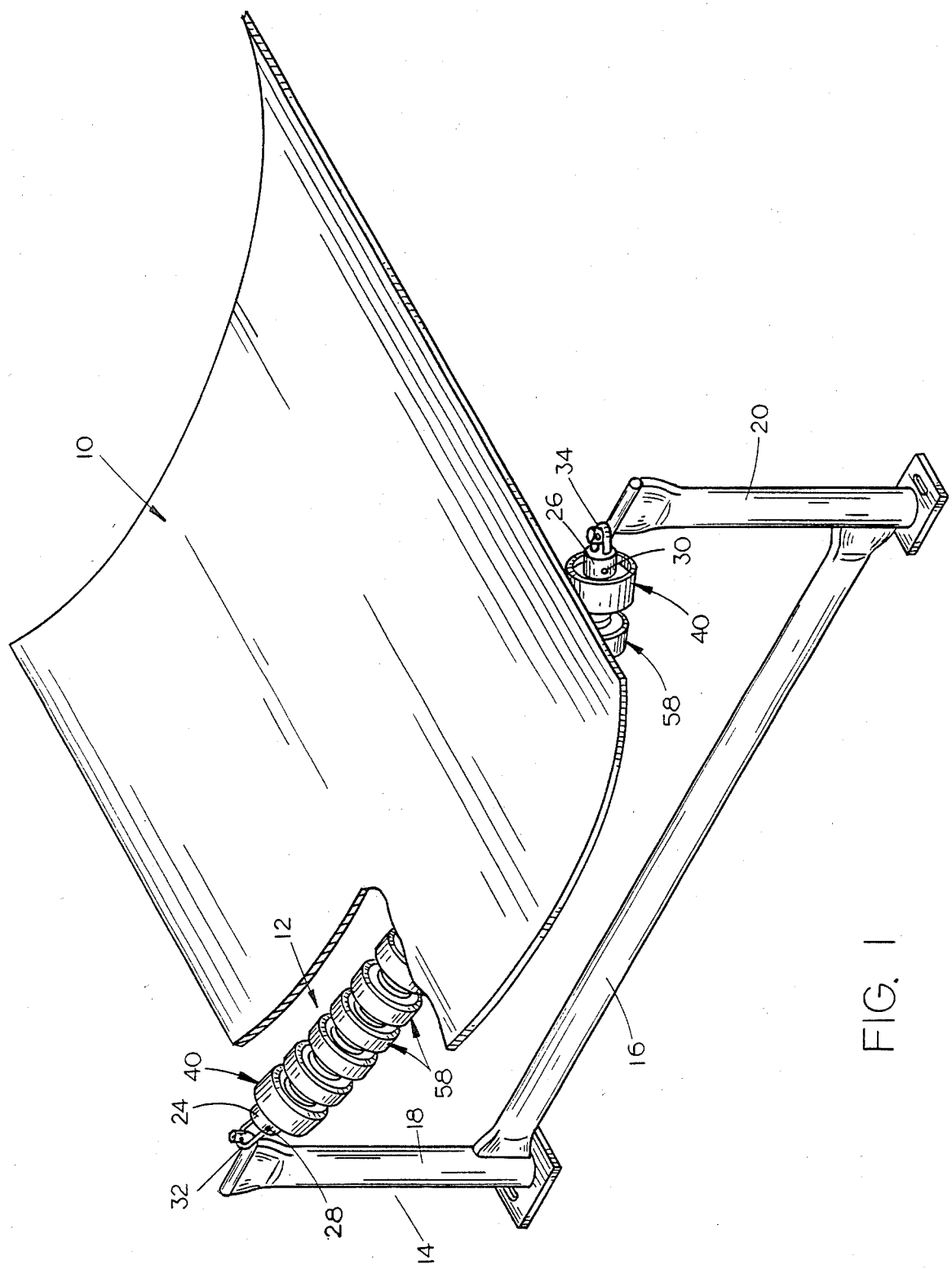
FIG. 1 is a partial perspective view of the idler roller assembly of this invention supporting a conveyor belt.

An idler roller assembly for supporting a troughed conveyor belt is disclosed herein comprising an elongated support rod curved along its length and being supported at its opposite ends by a suitable support means. An end idler wheel is rotatably mounted on the support rod adjacent each of the ends thereof. A plurality of intermediate idler wheels are rotatably mounted on the support rod between the end idler wheels. Each of the idler wheels comprises an elongated centrally disposed hub portion which is rotatably mounted on the support rod. The opposite ends of the hub portions of the intermediate idler wheels and the inner ends of the hub portions of the end idler wheels are provided with teeth formed therein which mesh with the teeth on the next adjacent hub portion so that the end idler wheels and intermediate idler wheels rotate in unison on the support rod. A flexible bellows element is positioned between each adjacent pair of idler wheels and has its ends sealably secured thereto to prevent external contaminants from entering the bearing surfaces. Means is also provided for sealing the outer ends of the end idler wheels.

DESCRIPTION OF THE PREFERRED EMBODIMENT

The numeral 10 refers generally to a troughed conveyor belt which is adapted to be supported by a plurality of idler roller assemblies 12 which are each supported on a support frame 14 including a base portion 16 and spaced-apart uprights 18 and 20.

Figure 5:
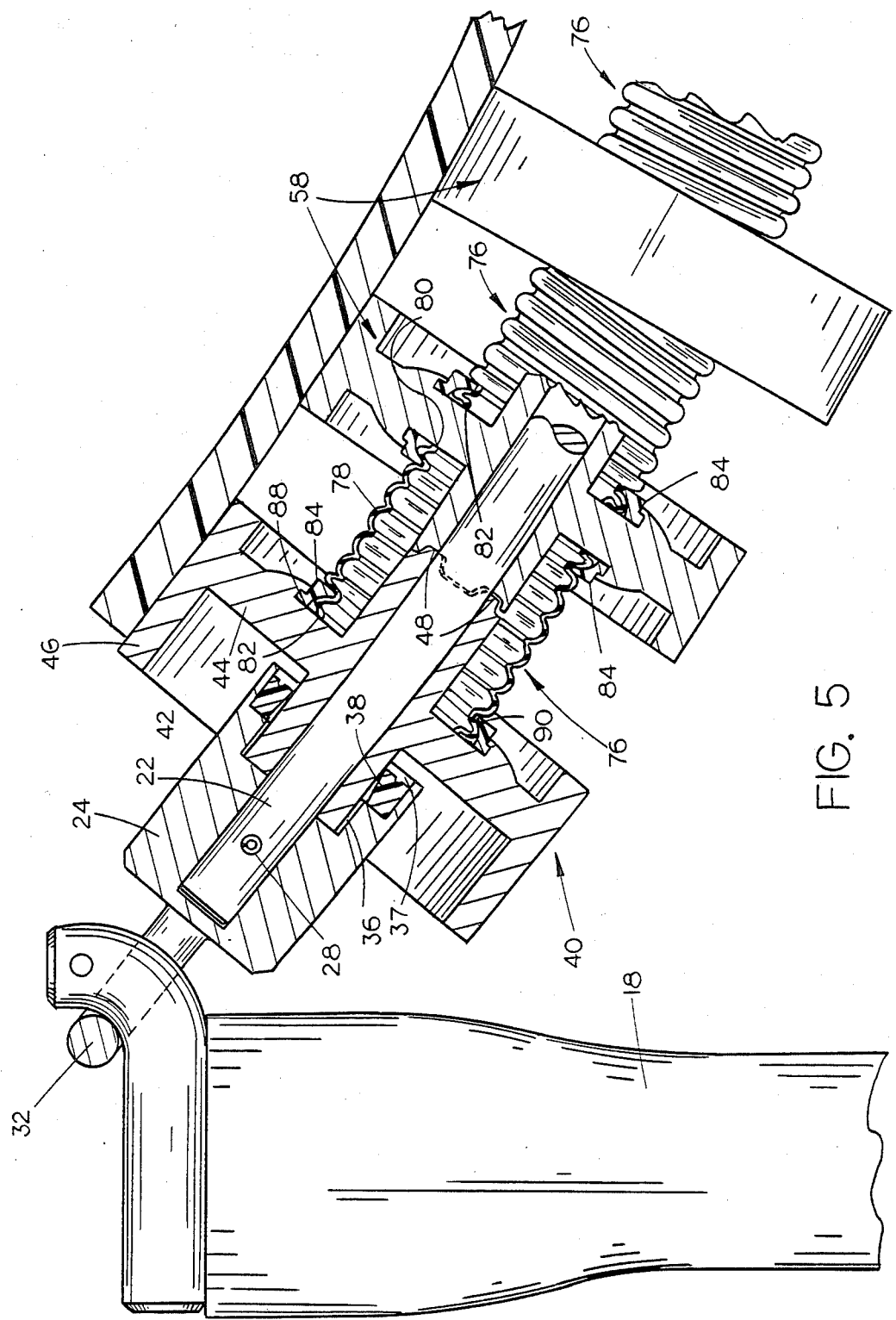
FIG. 5 is a partial sectional view of one end of the assembly.

Idler roller assembly 12 comprises an elongated curved support rod 22 having end caps 24 and 26 secured to the ends thereof by drive pins 28 and 30 respectively. End cap 24 includes a hook bar 32 secured thereto for attachment to the upper end of upright 18 as seen in FIGS. 1 and 5. Similarly, end cap 26 includes a hook bar 34 which is secured to the upper end of upright 20. End cap 24 is provided with bores 36 and 37 formed in the inner end thereof. As depicted in FIG. 5, seal 38 is received in bore 37.

An end idler wheel 40 is rotatably mounted on support rod 22 at each end thereof and includes a centrally disposed hub portion 42, a web element 44 extending radially outwardly therefrom and an outer peripheral rim portion 46. The inner end of hub portion 42 is provided with a plurality of spaced-apart teeth 48 as shown in FIGS. 3 and 5. As seen in FIG. 3, hub portion 42 is provided with an elongated bore 50 extending therethrough. Bore 50 is tapered radially inwardly from its center 52 so that the inner ends of the bore 50 has a greater diameter than the diameter at the center of the bore. The outer end of the bore 50 has a straight bore to conform to the straight ends of support rod 22 to ensure better thrust alignment and better contact between end seal 38 and the outer end of the wheel hub. The purpose of the tapered bore at the inner end of the hub is to permit the efficient rotation of the end idler wheel 40 on the curved support rod 22. The inner end of web element 44 is provided with an annular projecting lip or shoulder which defines a recessed area 56.

A plurality of intermediate idler wheels 58 are positioned between the end idler wheels 40 as illustrated in the drawings. Each of the idler wheels 58 includes a centrally disposed hub portion 60, web element 62 and peripheral rim portion 64. Hub portion 60 is provided with a tapered bore 66 which is tapered similarly to tapered bore 50 in the end idler wheels so that the diameter of the bore is greater at its end than at its center. The inner and outer sides of web element 62 are provided with annular recesses 68 and 70 and projecting lips 72 and 74 respectively. The ends of hub portion 60 are each provided with spaced-apart teeth 75 which are adapted to engage the teeth on the next adjacent hub portion.

The numeral 76 refers to a flexible bellows element which is positioned between each adjacent pair of idler wheels. Bellows element 76 includes a plurality of spaced-apart convolutions 78 positioned between ends 80 and 82. Snap ring 84 is mounted on each end of the bellows element 76 as seen in the drawings. Each of the snap rings 84 comprises base portion 86 having flange portion 88 extending radially outwardly therefrom and shoulder portion 90 extending radially inwardly therefrom defining opening 92.

The end convolution of a bellows element 76 is pushed through the opening 92 so that the end convolution is positioned inwardly of shoulder portion 90 to maintain the snap ring 84 on the bellows element. Flange portion 88 is designed to be "snapped" into one of the recessed areas 56, 68 or 70 with the associated lip maintaining the snap ring 84 in place. When so positioned, the end of the bellows element engages the surface of the web element.

The idler roller is assembled as viewed in FIGS. 1 and 5. The intermediate idler wheels 58 are positioned between the end wheels on the support rod 22, so that the teeth on the hub portions engage or mesh with the teeth on the next adjacent hub portion. The snap rings 84 maintain the bellows elements in position and seal the interiors thereof since the snap rings are securely and sealably secured to the idler wheels. The sealing action is further enhanced by the engagement of the ends of the bellows elements with the web elements of the idler wheels. The relationship of the end idler wheels 40 with the end caps 24 and 26 and the seals in openings 37 seal the ends of the assembly.

The tapered bores in the hub portions of the intermediate idler wheels and the tapered bore at the inner ends of the end idler wheels permit the efficient rotation of the wheels on the curved support rod. The engagement of the teeth on the hub portions of the idler wheels causes all of the idler wheels to rotate in unison. The nylon composition of the idler wheels provides desirable lubricity between the idler wheels and the support rod. In addition, a suitable lubricant is used.

Thus it can be seen that a novel idler roller has been provided which ensures that all of the idler rollers mounted on the curved support rod will rotate in unison in an energy efficient manner. The means of sealing the interiors of the idler wheels ensures that environmental contaminants will be excluded therefrom. It can therefore be seen that the invention accomplishes at least all of its stated objectives.

I claim:

1. An idler assembly for supporting a conveyor belt, comprising, an elongated support rod curved along substantially its entire length and having opposite ends, means for supporting the ends of said support rod, an end idler wheel rotatably mounted on said support rod adjacent each of the opposite ends thereof, each of said end idler wheels comprising an elongated central hub portion rotatably mounted on said rod and having inner and outer ends, a web means extending radially outwardly from said central hub, and an outer peripheral rim surface extending around the outer end of said web means, a plurality of intermediate idler wheels rotatably mounted on said rod between said end idler wheels, each of said intermediate idler wheels comprising a central hub portion which is rotatably mounted on said support rod, a web means extending radially outwardly from said hub portion, and an outer peripheral rim portion extending around the outer end of said web means, said end idler wheels and intermediate idler wheels being operatively interconnected whereby said end idler wheels and said intermediate idler wheels rotate in unison as the conveyor belt moves thereover, said inner ends of the hub portions of said end idler wheels and the ends of said hub portions of said intermediate idler wheels having gear teeth provided thereon which mesh with the gear teeth on the next adjacent hub portion, a flexible bellows sealably secured to and extending between the web means of each adjacent pair of idler wheels which sealably encloses the hub portions of said intermediate idler wheels and said end idler wheels for excluding contaminants from the interiors thereof, said flexible bellows comprising a generally cylindrical resilient material having radial convolutions therein, and means sealing the outer ends of said hub portions of said end idler wheels for preventing contaminants from entering the interiors of said hub portions, said sealing means including a resilient, generally circular snap ring having a flange portion extending radially outwardly therefrom and an arcuate shoulder portion extending radially inwardly to define a generally circular opening, each of said idler wheels having an annular recess therein adapted to receive said snap ring flange portion, and said snap ring shoulder portions adapted to retain the end convolution of said bellows compressively against said web.

2. The assembly of claim 1 wherein each of said central hub portions of said intermediate idler wheels have elongated bores formed therein, the bores of each of said hub portions having greater diameters at the ends thereof than the diameter at the center thereof to provide bore portions which taper radially outwardly from the center thereof towards the ends thereof.

3. The assembly of claim 1 wherein said gear teeth comprises spaced-apart, substantially rectangular projections spaced by substantially rectangular openings whereby the projections on one hub portion may be received by the openings on the next adjacent hub portion so that said idler wheels rotate in unison.

4. The assembly of claim 1 wherein each of said idler wheels is comprised of nylon.

5. The assembly of claim 2 wherein the central hub portion of each of said end idler wheels have elongated bores formed therein, the elongated bore of each of said end idler wheels having a tapered inner end so that the diameter of said bore is greater at its inner end than at its center.

* * * * *